United States Patent Office 3,651,088
Patented Mar. 21, 1972

3,651,088
CERTAIN ANILINOALKYL MERCAPTANS AS FUNGICIDES
Asbjorn Baklien, Kingsbury, Victoria, and Jocelyn Margaret Gregory, Croydon, Victoria, Australia, assignors to Imperial Chemical Industries of Australia and New Zealand Limited, Melbourne, Victoria, Australia
No Drawing. Filed Sept. 30, 1968, Ser. No. 763,975
Claims priority, application Australia, Oct. 31, 1967, 29,186/67
Int. Cl. A01n 9/20
U.S. Cl. 424—330     6 Claims

ABSTRACT OF THE DISCLOSURE

Fungicidal compositions containing as the active ingredient certain anilinoalkyl mercaptans. The compositions are useful for controlling bunt, smut, Tilletia spp. and other fungi.

---

The present invention relates to new compositions of matter containing as an active ingredient mercaptans and in particular it relates to new compositions of matter containing as an active ingredient anilinoalkyl mercaptans useful as fungicides.

It is known that certain chemicals may be applied to seeds, bulbs, corms, tubers and roots of plants to prevent their decay after planting and to control seed-borne and soil-borne plant diseases. Such chemicals act as fungicides and may be classified as disinfestants, disinfectants or protectants according to the location of the organisms to be combated. Disinfectants inactivate organisms, such as bunt spores, that are borne on the surface of the seed. Disinfectants are effective against organisms located deeper within the seed. Protectants protect the seed from attack by organisms that are present in the soil. Fungicides may be organic or inorganic chemicals and examples of known fungicides include organic mercurial compounds for example ethyl mercuric chloride and ethyl mercuric p-toluenesulphonanilide, tetrachloro-p-benzoquinone, tetramethylthiuram disulphide and hexachlorobenzene. It has, however, been noted that the efficacy of certain fungicides, e.g. hexachlorobenzene against bunt and smut, has decreased over the years because strains of Tilletia spp. emerged which were tolerant to hexachlorobenzene.

We have now found that bunt and smut and particularly strains of Tilletia spp. may be controlled by the use of anilinoalkyl mercaptans applied to seeds, bulbs, corms, tubers and roots of plants.

We have further found that the diseases wilt (Fusarium spp.) and rot (Rhizoctonia spp.) are controlled by certain compounds of this invention.

Accordingly we provide new compositions of matter comprising firstly as the active ingredient at least one of the compounds of the general formula:

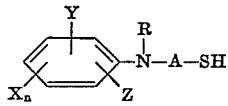

wherein X, Y and Z, separately, are selected from the group consisting of hydrogen, alkyl containing from 1 to 4 carbon atoms inclusive, alkoxy containing from 1 to 4 carbon atoms inclusive, alkylthio containing from 1 to 4 carbon atoms inclusive, aralkyl, aryloxy, halogen, nitro, cyano, CF$_3$, acylamino, alkylamino, dialkylamino, hydroxy and alkoxycarbonyl, R is selected from the group consisting of alkyl containing from 1 to 4 carbon atoms inclusive or acyl containing from 1 to 4 carbon atoms. A may be a branched or straight chain alkylene radical containing from 2 to 12 carbon atoms inclusive, optionally containing ether, thio or N-linkages and optionally substituted by halogen and $n$ is an integer from 1 to 3 inclusive; and secondly an inert carrier.

Examples of compounds which are effective as active constituents of our compositions and which demonstrate suitable substituents are listed in Tables I and II. In Table I A is

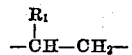

and R$_1$ is tabulated. In Tables I and II substituent X is tabulated whilst substituents Y and Z are both hydrogen.

TABLE I

Compounds of the formula

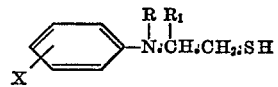

| No. | X | R | R$_1$ |
|---|---|---|---|
| 1 | H | H | H |
| 2 | H | H | Me |
| 3 | H | H | Et |
| 4 | H | H | (CH$_2$)$_5$CH$_3$ |
| 5 | H | H | (CH$_2$)$_9$CH$_3$ |
| 6 | H | H | CH$_2$Cl |
| 7 | H | H | CH$_2$OBu |
| 8 | H | H | CH$_2$S isoPr |
| 9 | H | H | Ph |
| 10 | H | Me | H |
| 11 | H | Me | Me |
| 12 | H | Et | H |
| 13 | H | C$_{12}$H$_{25}$ | H |
| 14 | H | Ac | H |
| 15 | H | Ac | Me |
| 16 | H | EtCO | H |
| 17 | H | Ph | H |
| 18 | H | Ph | Me |
| 19 | o-Me | H | H |
| 20 | o-Me | H | Me |
| 21 | m-Me | H | H |
| 22 | p-Me | H | H |
| 23 | p-Me | H | Me |
| 24 | p-Me | Me | H |
| 25 | o-Et | H | H |
| 26 | p-isoPr | H | H |
| 27 | p-tert.Bu | H | H |
| 28 | p-tert.Bu | H | Me |
| 29 | p-tert.Bu | Me | H |
| 30 | o-MeO | H | H |
| 30a | H | H | PhCH$_2$SCH$_2$— |
| 31 | m-MeO | H | Me |
| 32 | p-MeO | H | H |
| 33 | p-MeO | H | Me |
| 34 | o-EtO | H | H |
| 35 | m-EtO | H | Me |
| 36 | p-EtO | H | H |
| 37 | p-EtO | H | Me |
| 38 | p-EtO | H | Et |
| 39 | p-t.BuO | H | H |
| 40 | m-MeS | H | H |
| 41 | m-MeS | H | Me |
| 42 | m-MeS | Me | H |
| 43 | o-MeS | H | H |
| 44 | p-MeS | H | H |
| 45 | p-isoPrS | H | H |
| 46 | o-F | H | H |
| 47 | m-F | H | H |
| 48 | p-F | H | H |
| 49 | p-Cl | H | Me |
| 50 | p-Cl | Me | Me |
| 51 | p-Cl | H | H |
| 52 | o-Cl | H | H |
| 53 | m-Cl | H | H |
| 54 | p-Br | H | H |
| 55 | p-I | H | H |
| 56 | o-NO$_2$ | H | H |
| 57 | m-NO$_2$ | H | H |
| 58 | p-NO$_2$ | H | H |
| 59 | p-NO$_2$ | Me | H |
| 60 | p-NO$_2$ | H | Me |
| 61 | m-CF$_3$ | H | H |
| 62 | m-CN | H | H |
| 63 | p-AcNH | H | H |
| 64 | o-AcNH | H | H |
| 65 | p-NMe$_2$ | H | H |
| 66 | p-NMe$_2$ | H | Me |
| 67 | p-OH | H | H |
| 68 | o-CF$_3$ | H | H |
| 69 | 2.4-Me$_2$ | H | H |
| 70 | 2.5-Me$_2$ | H | H |
| 71 | 2.6-Me$_2$ | H | H |
| 72 | 3.4-Me$_2$ | H | H |
| 73 | 2.4-Cl$_2$ | H | H |
| 74 | 3.4-Cl$_2$ | H | H |
| 75 | 2-Me-4-Cl | H | H |
| 76 | 4-Me-3-Cl | H | H |
| 77 | 2-MeO-4-Cl | H | H |

TABLE I.—Continued

| No. | X | R | R₁ |
|---|---|---|---|
| 78 | 2-Cl-4-NO₂ | H | H |
| 79 | 3-Cl-4-NO₂ | H | H |
| 80 | 2-Cl-4-Me | H | Me |
| 81 | 2-MeO-5-NO₂ | H | H |
| 82 | 2-NO₂-2-Me | H | H |
| 83 | 4-NO₂-2-Me | H | H |
| 84 | 2-MeO-4-NO₂ | H | H |
| 85 | 2-OH-4-NO₂ | H | H |
| 86 | 2-Me-4-OMe | H | H |
| 87 | 4-Cl-3-CF₃ | H | H |
| 88 | 2,4,5-Cl₃ | H | H |
| 89 | 2,4-(OMe)₂-5-Cl | H | H |
| 90 | 2-Me-4-NO₂-5-Cl | H | H |
| 91 | 2-OH-3-NO₂-5-Me | H | H |
| 92 | 2,5(OMe)₂-4-Cl | H | H |
| 93 | 2-MeO-4-NO₂-5-Me | H | H |
| 104 | 2NO₂-4-Cl | H | H |
| 105 | 4-ClCH₂CH₂— | H | H |
| 106 | 4-NH₂CO.CH₃ | H | H |
| 107 | 4-COOEt | H | H |
| 108 | —CN | H | H |
| 109 | 4-PhCH₂— | H | H |
| 110 | 4-PhO— | H | H |
| 111 | H | H | 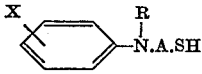—CH₂—S—CH₂ |
| 112 | H | Ph | H |
| 113 | H | H | PhCH₂ |
| 114 | p-NEt₂ | H | CH₃ |
| 115 | 2,4-F₂ | H | H |
| 116 | m-CF₃ | H | H |

TABLE II
Compounds of the formula:

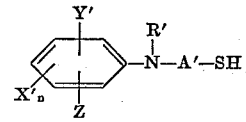

| No. | X | R | A |
|---|---|---|---|
| 94 | H | H | —CH₂CHMe— |
| 95 | H | sec Bu | —CH₂CHMe— |
| 96 | H | H | —CH₂CHEt— |
| 97 | H | H | —CHMe.CHMe— |
| 98 | H | Me | —CHMe.CHMl— |
| 99 | 4-tert.Bu | H | —CHMe.CHMe— |
| 100 | H | secBu | —CHMe.CHMe— |
| 101 | H | H | —CH₂CH₂CH₂— |
| 102 | H | H | —(CH₂)₄— |
| 103 | H | H | —(CH₂)₂O (CH₂)₂— |

By inert carrier we mean either a liquid or a solid diluent used to obtain the desired concentration and to facilitate handling. For some purposes liquid formulations are convenient and among these again aqueous liquid formulations are preferred. The latter may conveniently be prepared from emulsifiable solutions of the active compounds in organic solvents by dissolving the active ingredients in a solvent which is non-phytocidal to the seed which is to be treated e.g. in acetone, xylene, toluene, kerosene or the methylated naphthalenes, adding an emulsifier and/or wetting agent and emulsifying the solution in water. A typical emulsifiable concentrate of this type would comprise 10% of N-phenylcysteamine, 80% acetone, 5% xylene and 5% of an alkyl aryl polyether alcohol emulsifier, all quantities being expressed on a weight basis. Alternatively our mixtures may also be formulated into slurries by dissolving the active ingredients in non-phytocidal solvents and adding the solution so formed to aqueous slurries of solid inert carriers such as powdered chalk, talcs, china clays, kieselguhr, bentonite and other colloidal clays.

Our mixtures may also be formulated into dusts by combining them with solid inert carriers as above disclosed. They may also be formulated as dispersible powders by milling the active ingredient to a fine powder, optionally, together with an inert solid carrier as above disclosed and adding a dispersing agent. The preferred dispersible powders comprise the active ingredient, finely ground with a colloidal clay together with a dispersing agent. Suitable emulsifying and dispersing agents are known from the prior art; anionic, cationic and nonionic agents may be used. A suitable nonionic emulsifier is for example the condensation product of nonylphenol with ethylene oxide available commercially under the trademark "Lissapol" N; suitable dispersing agents are for example the disodium salt of dinaphthylmethane disulphonic acid, sodium lauryl sulphonate and the condensation product of alkylphenol with ethylene oxide available commercially under the trademark "Lubrol" E.

Certain of the active ingredients, typically represented by the compounds of Tables I and II are new substances. Accordingly we also provide compounds of the formula:

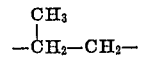

wherein X', Y' and Z' separately are selected from the group consisting of hydrogen, alkyl containing from 1 to 4 carbon atoms inclusive, alkoxy containing from 1 to 4 carbon atoms inclusive, alkylthio containing from 1 to 4 carbon atoms inclusive, halogen, CF₃, nitro, cyano, acylamino, dialkylamino, alkylamino, hydroxy, aralkyl, aryloxy, or alkoxycarbonyl. R' may be alkyl containing from 1 to 4 carbon atoms inclusive or acyl containing from 1 to 4 carbon atoms inclusive. A' may be a branched or straight chain alkylene group containing from 2 to 12 carbon atoms inclusive optionally containing ether, N- or thio linkages and optionally substituted by halogen, $n$ is an integer from 1 to 3 inclusive; with the provisos that:

(a) whenever A' is —CH₂—CH₂— and R', X' and Y' are hydrogen then Z' is other than hydrogen, methyl, methoxy or p-chloro and (b) whenever A' is —CH₂—CH₂— and R' is methyl, or whenever A' is $$-\overset{CH_3}{\underset{|}{C}H_2}-CH_2-$$

and R' is hydrogen, then at least one of X', Y' or Z' is other than hydrogen.

The active ingredients of our compositions may be prepared by several methods, for example:

(1) by reacting anilines with alkylene-1.2-sulphides according to the equation:

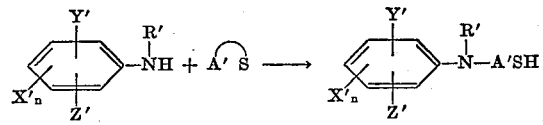

wherein X', Y', Z', R', A' and $n$ are as hereinbefore defined:

(2) by converting an alkyl halide, preferably a bromide or a mercaptan, e.g.

(a) 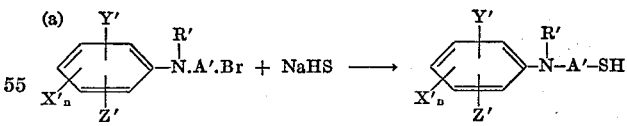

(b) 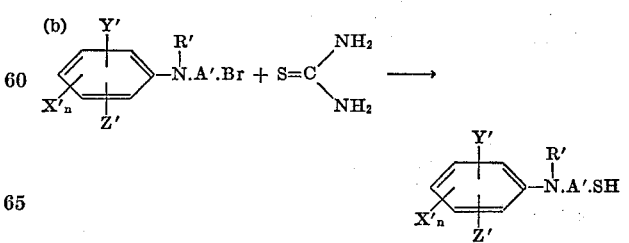

wherein X', Y', Z', R', A' and $n$ are as above defined.

(3) by mercaptoethylation of anilines: e.g.

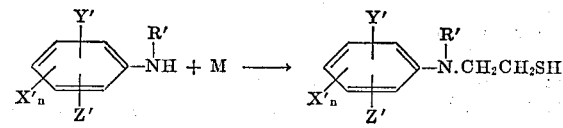

wherein M stands for one of the following substances:

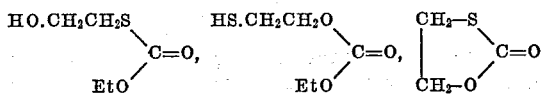

and wherein X', Y', Z', R' and n are as above defined.

(4) by the hydrolysis of N-aryl-2-thiothiazolidines: e.g.

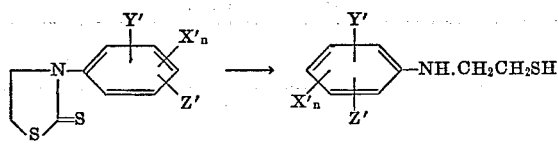

wherein X', Y', Z', R' and n are as above defined.

(5) by the addition of anilines to vinyl sulphide: e.g.

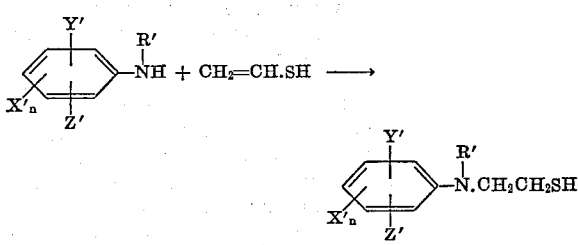

wherein X,' Y,' Z,' R' and n are as above defined.

The compositions of our invention have useful pesticidal, particularly fungicidal properties. Thus we have discovered that these compositions have a high fungicidal activity when applied to media containing fungi, for example *Tilletia foetida, Ustilago hordei, Fusarium oxysporum* or *Rhizoctonia solani*. When for example a medium sprayed with spores of *Tilletia foetida* or *Ustilago hordei* is incubated and then treated with compositions according to our invention, concentrations of active ingredient as low as 2 parts per million based on the weight of the medium were effective in controlling spore development.

Accordingly we provide a process of controlling the growth of undesired fungi which comprises treating said undesired fungi with a composition according to this invention.

We have also discovered that when seeds, bulbs, corms, tubers or roots of plants which are infected or infested with fungi, whether now the infestation or infection occurred prior to or subsequent to planting, are treated prior to planting with compositions according to our invention, the growth of said fungi is controlled. Compositions containing as little as 70 parts of active ingredient per million parts of seed are useful in controlling fungi, e.g. *Tilletia foetida* on wheat seeds; 150 parts of active ingredient per million parts of seed are preferred and 250 parts of active ingredient per million parts of seed are most preferred.

Accordingly we also provide a process of treating seeds, bulbs, corms, tubers or roots of plants with a composition according to our invention.

Under suitable climatic conditions our compositions may also be used to treat soil to inhibit fungal activity in the soil prior to planting seeds and the like therein.

In contrast to the conventional fungicides based on mercury the compositions according to our invention have a low level of toxicity. Many of the compounds used as active ingredients in our compositions are non-toxic to mice at concentrations in excess of 1000 mg./kg.

The following examples illustrate the preparation of the compositions of our invention and their biological effects.

EXAMPLE 1

4 g. N-phenylcysteamine were dissolved in 91 g. acetone: 5 g. of "Lissapol" N were added, and the whole was mixed. There was thus obtained a composition containing 4% w./w. of N-phenylcysteamine, which was suitable for dilution with water to give a dispersion of the active ingredient.

EXAMPLE 2

4 g. N-phenylcysteamine dissolved in 6 g. acetone was added to 12 g. finely divided china clay. The acetone was evaporated from the mixture and the resultant product was ground to a fine powder. There was thus obtained a composition in the form of a fine powder or dust containing 25% w./w. of N-phenylcysteamine as active ingredient suitable for dilution by the addition of inert carriers.

EXAMPLE 3

12 g. finely divided china clay was dispersed in 24 g. water to form a slurry. To the slurry so prepared was added a solution of 4 g. N-phenylcysteamine dissolved in 6 g. acetone. The acetone was evaporated from the mixture so prepared, and sufficient water was then added to bring the total weight of the composition to 40 g. On further mixing there was thus obtained a composition in the form of a slurry containing 10% w./w. of ethyl N-phenylcysteamine as active ingredient suitable for dilution by the addition of water.

EXAMPLE 4

The composition obtained in Example 1 was diluted with appropriate amounts of water so that when 0.5 ml. of the diluted suspension of N-phenylcysteamine was mixed in 1 oz. jars with 20 ml. of 1% w./w. agar in water, the concentration of active ingredient was 25, 10, 2 and 0.4 p.p.m. with respect to the total weight of the agar-water mixture. A suspension containing a high concentration of spores was sprayed over the surface of the cooled agar and the inoculated mass was then incubated for four days. After this period of time the mass was inspected and the degree of inhibition of spores was assessed using as a comparison a system similarly prepared but in which there was no active ingredient.

The results are set out in Table III.

TABLE III

Active ingredient: N-phenylcysteamine

| Fungi | Degree of inhibition (percent) | |
| --- | --- | --- |
|  | (Hexachlorobenzene-resistant) *Tilletia foetida* | *Ustilago hordei* |
| Concentration of active ingredient, p.p.m.: | | |
| 25 | 100 | 100 |
| 10 | 100 | 100 |
| 2 | 100 | 80 |
| 0.4 | 100 | Nil |
| 0.08 | Nil | Nil |
| 0.0 | Nil | Nil |

This example demonstrates that fungi may be inhibited in vitro when treated with N-phenylcysteamine.

EXAMPLE 5

A bunt susceptible strain of wheat was inoculated with *Tilletia foetida* by adding to the wheat seed 0.5% of its weight of spores of *Tilletia foetida* and ball-milling the mixture of wheat and spores sufficiently to ensure an even distribution of spores. Compositions from Example 2 were then prepared, undiluted and diluted with varying amounts of china clay to give 25% (undiluted), 12½%, 6¼% and 3⅛% w./w. of active ingredient; these were added to the inoculated wheat seed at the rate of 2 oz. per bushel of seed. The concentrations of active ingredient so obtained were 500, 250, 125 and 62 parts per million parts of seed. For comparison the inoculated seed was also treated with a known fungicide, hexachlorobenzene, at the rate of 500 parts per million parts of seed. Twenty wheat seeds per treatment were sown in John Innes compost contained in 2 oz. paper cups and allowed to germinate in an incubator until they had reached a suitable height for transplanting to 5" pots containing soil typical of that in wheat-growing areas in Australia. The plants were grown to maturity in a glass house and the percentage of diseased heads obtained from seeds of each treatment was assessed. The results are set out in Table IV.

TABLE IV

Effect of applying fungicides in dust form to wheat seed inoculated with *Tilletia foetida* (hexachlorobenzene-resistant)

| Active ingredient | Concentration of active ingredient, p.p.m. | Percent disease in wheat |
|---|---|---|
| N-phenylcysteamine | 500 | 0 |
|  | 250 | 0 |
|  | 125 | 0 |
|  | 62 | 21 |
| Hexachlorobenzene | 500 | 45 |

EXAMPLE 6

A bunt-susceptible strain of wheat was inoculated with hexachlorobenzene-resistant *Tilletia foetida* by adding to the wheat seed 0.5% of its weight of spores of said *Tilletia foetida* and ball-milling the mixture sufficiently to ensure an even distribution of spores. The composition from Example 3 was added to the inoculated wheat seed at the rate of 2.5 fluid oz. per bushel of seed. The mixture was ball-milled until a uniform product was obtained, containing 250 parts of active ingredient per million parts of seed. Similarly compositions from Example 3 were also diluted with water to give compositions containing 5% w./w. and 2.5% w./w. which, when added to the inoculated wheat seed at the rate of 2.5 fluid oz. per bushel of wheat seed, gave concentrations of 125 and 62 parts of active ingredient per million parts of seed. Twenty wheat seeds per treatment were sown in John Innes' compost contained in 2 oz. paper cups and allowed to germinate in an incubator until they had reached a suitable height for transplanting to 5" pots containing soil typical of that in wheat-growing areas in Australia. The plants were grown to maturity in a glass house and the percentage of diseased heads obtained from seeds of each treatment was assessed. Results are set out in Table V.

TABLE V

Effect of applying a fungicide in slurry form to wheat seed inoculated with *Tilletia foetida* (hexachlorobenzene-resistant)

| Active ingredient | Concentration of active ingredient, p.p.m. | Percent disease in wheat |
|---|---|---|
| N-phenylcysteamine | 250 | 0 |
|  | 125 | 0 |
|  | 62 | 18 |

EXAMPLE 7

Example 5 was repeated except that the wheat seed was inoculated with *Ustilago hordei* instead of *Tilletia foetida*. The results obtained are set out in Table VI.

TABLE VI

Effect of applying fungicides in dust form to wheat seed inoculated with *Ustilago hordei*

| Active ingredient | Concentration of active ingredient, p.p.m. | Percent disease in wheat |
|---|---|---|
| N-phenylcysteamine | 500 | 0 |
|  | 250 | 0 |
|  | 125 | 5 |
|  | 62 | 24 |

EXAMPLE 8

Example 6 was repeated except that the wheat seed was inoculated with *Ustilago hordei* instead of *Tilletia foetida*. The results obtained are set out in Table VII.

TABLE VII

Effect of applying a fungicide in slurry form to wheat seed inoculated with *Ustilago hordei*

| Active ingredient | Concentration of active ingredient, p.p.m. | Percent disease in wheat |
|---|---|---|
| N-phenylcysteamine | 250 | 3 |
|  | 125 | 0 |
|  | 62 | 25 |

EXAMPLE 9

N-phenylcysteamine was formulated by the method of Example 1. The composition obtained was diluted with appropriate amounts of water so that when 0.5 ml. of the diluted suspension of N-phenylcysteamine was mixed in 1 oz. jars with 20 ml. of 1% w./w. agar in water, the concentration of active ingredient was 25, 10, 2 and 0.4 p.p.m. with respect to the total weight of the agar-water mixture. The contents of the jars were then poured into Petri dishes. A plug of agar (approximately 1/16th square inch) bearing mycelia growth of *Fusarium oxysporum* (Experimental series A) and *Rhizoctonia solani* (Experimental series B) was placed on the cool and set agar of two experimental series, respectively, and incubated for five days when the dgree of inhibition of mycelial growth was assessed. Results are shown in Table VIII.

EXAMPLE 10

N-(p-fluorophenyl)cysteamine was formulated and tested by the method described in Example 9. Results are shown in Table VIII.

EXAMPLE 11

N-(p-tert-butylphenyl)cysteamine was formulated and tested by the method described in Example 9. The results are shown in Table VIII.

TABLE VIII

| | Percent inhibition of growth of fungi (p.p.m.) | | | | | | | |
|---|---|---|---|---|---|---|---|---|
| | A *Fusarium oxysporum* | | | | B *Rhizoctonia solani* | | | |
| Active ingredient | 10 | 2 | 0.4 | 0.08 | 10 | 2 | 0.4 | 0.08 |
| N-phenylcysteamine (Ex. 9) | 100 | 100 | 50 | 0 | 100 | 85 | 75 | 50 |
| N-(p-fluorophenyl) cysteamine (Ex. 10) | 100 | 55 | 5 | 0 | 100 | 50 | 5 | 0 |
| N-(p-tert.butylphenyl)cysteamine (Ex. 11) | 100 | 50 | 0 | 0 | 100 | 50 | 0 | 0 |

EXAMPLE 12

Example 4 was repeated with the compound N-(p-fluorophenyl)-cysteamine. The results are shown in Table IX.

TABLE IX

Active ingredient: N-(p-fluorophenyl)cysteamine

| | Degree of inhibition (percent) | |
|---|---|---|
| Fungi | (Hexachlorobenzene resistant) *Tilletia foetida* | *Ustilago hordei* |
| Concentration of active ingredient, p.p.m.: | | |
| 25 | 100 | 100 |
| 10 | 100 | 100 |
| 2 | 80 | 80 |
| 0.4 | 50 | 50 |
| 0.08 | 0 | 0 |

EXAMPLE 3

N-phenylcysteamine 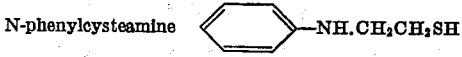

A mixture of aniline (69.6 g., 0.75 mole) and freshly distilled ethylene sulphide (18 g., 0.3 mole) was kept at room temperature for 24 hours and then at 55° C. (in a pressure bottle) for 6 hours. The mixture was distilled under reduced pressure to give a fraction of substantially pure N-phenylcysteamine, B.P. 100–6°/0.01 mm. Yield 42.1 g., 92% of theoretical $n_D^{22}$ 1.6038.

By the same method of the following compounds, as designated by their numbers given in Table I, were prepared and at least one physical constant was determined thereon.

TABLE X

| Number of compound in Table I: | Boiling point (° C.)/mm. Hg | Refractive index/° C. |
| --- | --- | --- |
| 10 | 80–82/0.1 | 1.5951/20 |
| 12 | 100–101/0.05 | 1.5840/20 |
| 19 | 101–105/0.001 | 1.5815/22 |
| 22 | 134–139/0.01 | |
| 26 | 89–90/0.03 | 1.5685/20 |
| 27 | 117–123/0.001 | 1.5515/20 |
| 36 | 143–156/0.01 | |
| 44 | 130–131/0.05 | 1.6435/20 |
| 46 | 90–91/0.05 | 1.5778/20 |
| 47 | 85–87/0.005 | 1.5780/20 |
| 48 | 85–88/0.001 | 1.5640/19 |
| 51 | 132–138/0.01 | |
| 53 | 110–120/0.1 | 1.6133/20 |
| 75 | 130–140/0.01 | |

In addition further compounds were prepared by the same method, but no physical constant was determined. The compounds, as designated by their number in Table I, were 21, 24, 25, 30, 32, 52, 65, 68, 69, 71 and 72.

EXAMPLE 14

Using 1,2-propylene sulphide instead of ethylene sulphide, compound 114 of Table I was prepared by the method of Example 13 and found to have a boiling point of 107–136° C. at 0.01 mm. Hg. Similarly further compounds were prepared by the same method but no physical constant was determined. The compounds, as designated by their number in Table I, were 2, 11, 20, 23, 28, 31, 33, 35, 37, 41, 49, 50 and 70.

EXAMPLE 15

Using the sulphides designated in Table XI the following compounds, as designated by their number in Tables I and II, were prepared according to the method of Example 13.

TABLE XI

| Sulphide: | No. of compound in Tables I and II |
| --- | --- |
| 1,2-octylene sulphide | 4 |
| 1,2-dodecylene sulphide | 5 |
| 3-chloro-1,2-propylene sulphide | 6 |
| 3-butoxy-1,2-propylene sulphide | 7 |
| 3-isopropylthio-1,2-propylene sulphide | 8 |
| 1,2-butylene sulphide | 38 |
| 1,2-butylene sulphide | 102 |
| Phenylethylene sulphide | 113 |

EXAMPLE 16

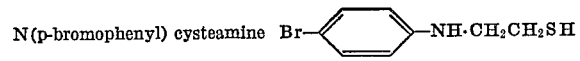
N(p-bromophenyl) cysteamine Br—⟨ ⟩—NH·CH₂CH₂SH

A mixture of p-bromoaniline (34.4 g., 0.2 mole) benzene (100 ml.) and ethylene sulphide (6 g.) was heated in a pressure bottle at 100° C. for 15 hours. The cooled reaction mixture was extracted with 1 N aq. NaOH (2× 100 ml.) and the extract neutralized with 4 N HCl. The product was extracted with benzene, the extract dried over anhydrous Na₂SO₄, filtered and the benzene distilled off to leave an oily residue. By the same method further compounds were prepared. The compounds, as designated by their number in Table I were 55, 57, 62, 63, 67, 76, 77, 81, 85, 86, 89 and 92.

EXAMPLE 17

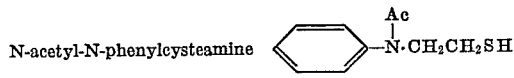
N-acetyl-N-phenylcysteamine

N-phenyl-N-acetyl-2-bromoethylamine (24.2 g., 0.1 mol) in ethanol (150 ml.) was added slowly and with stirring to a solution of NaOH (4.05 g.) in 50 ml. ethanol saturated with H₂S. The mixture was stirred at room temperature for 15 hours and then at 50° C. for 4 hours. The solvent was then distilled off under reduced pressure. The residue was stirred in water, the mixture neutralized to pH 5 and extracted with ether. The ether extract was evaporated to dryness and the product recrytallised from benzene.

By the same method further compounds were prepared. The compounds, as designated by their number in Table I, were 14, 16, 58, 59, 60, 73, 74, 78, 79, 80, 83, 88 and 112.

EXAMPLE 18

Sodium hydroxide (4.1 g.) in 30 ml. of absolute ethanol was saturated at 0° C. with H₂S and the clear solution treated slowly with 2-(2,4-difluoroanilino)ethyl bromide (23.6 g.) in 100 ml. of absolute alcohol. The mixture was kept at room temperature for 48 hours and then refluxed for 1 hour. The alcohol was evaporated and the residue taken up in water, acidified with acetic acid and the product extracted with ether. The ether solution was then dried, evaporated and the residual oil distilled in vacuo to give 15.7 g. (83% of theoretical) of N-(2,4-difluorophenyl) cysteamine, B.P. 138–41°/0.05 mm. Hg.

EXAMPLE 19

M-trifluoromethylaniline (16.1 g.), benzene (30 ml.), sodium methoxide (0.5 g.) and ethyl 2-mercaptoethyl carbonate (15 g.) were heated in a sealed tube for 2 hours at 130° C. The product was distilled in vacuo to give 15.7 g. (71% of theoretical) of N-(m-trifluoromethylphenyl) cysteamine B.P. 143–5°/0.05 mm. Hg.

EXAMPLE 20

Example 4 was repeated but the N-phenylcysteamine of that example was replaced by N-(m-trifluorophenyl)cysteamine. The results are shown in Table XII.

TABLE XII

Active ingredient: N-(m-fluorophenyl)cysteamine

| | Degree of inhibition (percent) | |
| --- | --- | --- |
| Fungi | (Hexachlorobenzene-resistant) Tilletia foetida | Ustilago hordei |
| Concentration of active ingredient, p.p.m.: | | |
| 10 | 100 | 100 |
| 2 | 100 | Nil |
| 0.4 | 80 | |
| 0.08 | 50 | |

We claim:
1. A fungicidal composition comprising, as the active ingredient, a fungicidally effective amount of a compound of the formula

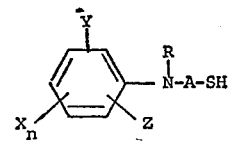

wherein X, Y and Z, separately, are selected from the group consisting of hydrogen, alkyl containing from 1 to 4 carbon atoms inclusive, alkoxy containing from 1 to 4 carbon atoms inclusive, alkylthio containing from 1 to 4 carbon atoms inclusive, benzyl, phenoxy, halogen, nitro, cyano, CF₃, acetylamino, dimethylamino, diethylamino and hydroxy, R is selected from the group consisting of alkyl containing from 1 to 4 carbon atoms inclusive and acyl containing from 1 to 4 carbon atoms, A is a branched or straight chain alkylene radical containing from 2 to 12 carbon atoms inclusive, optionally containing ether, thio or N-linkages and optionally substituted by chlorine and $n$ is an integer from 1 to 3 inclusive; and an inert fungicide carrier.

2. The fungicidal composition of claim 1 wherein the active ingredient is N-phenylcysteamine.

3. The fungicidal composition of claim 1 together with a dispersing agent.

4. The fungicidal composition of claim 1 wherein the active ingredient is dissolved in a non-toxic and non-phytocidal solvent together with a member of the group consisting of an emulsifier and a wetting agent.

5. The fungicidal composition according to claim 1 wherein the inert carrier is water.

6. A process of controllng the growth of undesired fungi which comprises treating said fungi with a fungicidally effective amount of the composition of claim 1.

References Cited
UNITED STATES PATENTS
3,221,013  11/1965  Fields et al. _____ 260—577

FOREIGN PATENTS
1,056,862  2/1967  Great Britain _____ 424—330

STANLEY J. FRIEDMAN, Primary Examiner
V. D. TURNER, Assistant Examiner

U.S. Cl. X.R.
260—465 E, 562 R, 570 R, 571, 574, 577; 424—304, 324